Dec. 25, 1962 — W. B. THRASHER — 3,070,176
LAWN TRIMMER
Filed Dec. 16, 1959 — 2 Sheets-Sheet 1

INVENTOR
William B. Thrasher
BY Eric P. Schellin
ATTORNEY

INVENTOR
William B. Thrasher

//www.w3.org/TR/html4/loose.dtd">

United States Patent Office 3,070,176
Patented Dec. 25, 1962

3,070,176
LAWN TRIMMER
William B. Thrasher, 900 E. Commerce St.,
San Antonio, Tex.
Filed Dec. 16, 1959, Ser. No. 860,014
3 Claims. (Cl. 172—16)

This invention relates to lawn trimmers. More particularly, the present invention relates to lawn trimmers useful in edging lawns.

The last few years has witnessed a tremendous growth of the suburban areas surrounding ever expanding cities. A chief factor contributing to the growth of suburbia is the desire of formerly city bound dwellers to obtain private homes with small plots of ground therearound. Naturally, in such instances, it is desirable to maintain a lawn on a major portion of such plots. As a consequence thereof, the suburbanites have come to lean quite heavily upon such motorized implements as powered lawn mowers as a means for achieving lawn maintenance and care. Unfortunately, the ordinary lawn mower, be it powered or not, does not clip sufficiently low to the ground to properly edge the lawns at the line of demarcation between the lawn and, for instance, a pathway. A number of different types of edgers have become available which are only somewhat useful in edging lawns. Most of these instruments have either been entirely unwieldy or extremely expensive, or both.

Accordingly, it is the primary object of the present invention to disclose a relatively compact, sturdy and efficient lawn trimming and edging device.

It is another object of the present invention to disclose a lawn trimming device having a unique protective housing therefor.

It is yet another object of the present invention to disclose a lawn trimming device having an ingenious handle mounting means thereon.

It is still another object of the present invention to disclose a lawn trimming device which may be easily and efficiently manipulated.

Additional objects and advantages of the present invention will become apparent upon a consideration of the following detailed description.

In the accompanying drawings, forming a part of this specification, and wherein similar reference numerals designate corresponding parts throughout the several views.

Figure 1:
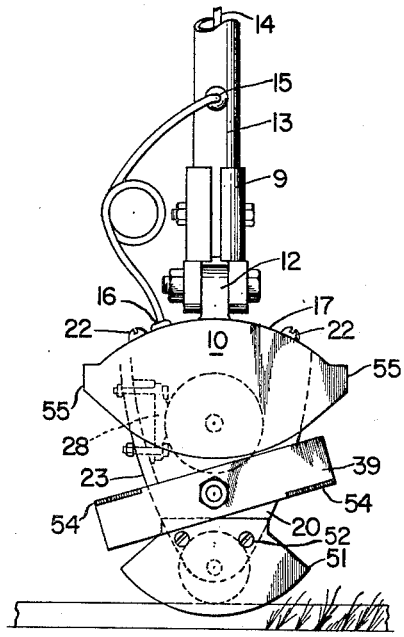
FIGURE 1 is a side elevational view of the lawn trimmer, showing a portion of the handle structure.
Figure 2:
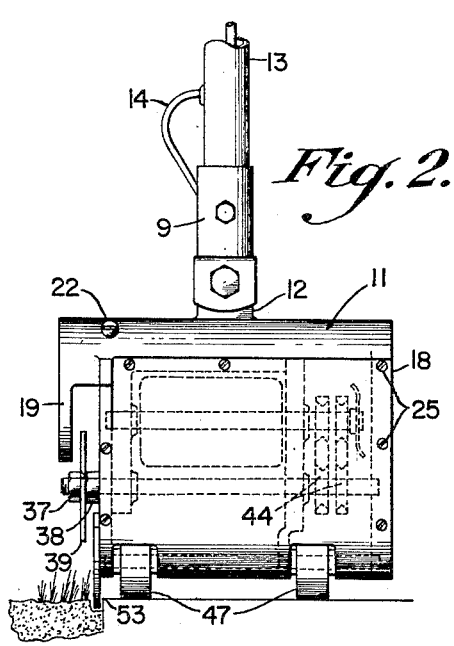
FIGURE 2 is a front elevational view of the lawn trimmer.

Now turning to the drawings, FIGS. 1 and 2 present a general appearance of the lawn trimmer 10. It will be seen that a light weight cast housing 11 retains many of the various parts of the device. In substantially the center portion of the top of the housing a drilled ear like portion 12 may be noted. A tubular handle 13 is clamped to this member by clamping means 9 having suitable bolts therefor. An electric conduit 14 traverses within the major portion of the handle and exits at 15 and enters the upper portion of the housing at 16. A switch, not shown, may be located in the conduit at some convenient place along the upper reaches of the handle, for instance.

The housing 11 has many unusual construction features. It will be noted that it possesses a longitudinal arcuate top 17. At one end, the housing has a vertical wall 18 which has a substantially inverted triangular arrangement. At the other end there is a depending guard arrangement 19. Inward from the guard is a vertical end plate 20 which approximates the general configuration of the vertical end wall 18, thereby giving the housing a symmetrical appearance. End plate 20 is secured to the arcuate top 17 by means of suitable screws 21 and 22. Furthermore, wall 18 and the end plate 20 are connected by a sloping rear wall 23 which is actually cast integral with the top 17 and wall 18, thereby lending rigidity to the entire structure. The housing is further enclosed by front cover plate 24 which is secured to the housing by means of screws 25 through drilled holes in the cover plate 24.

Figure 4:
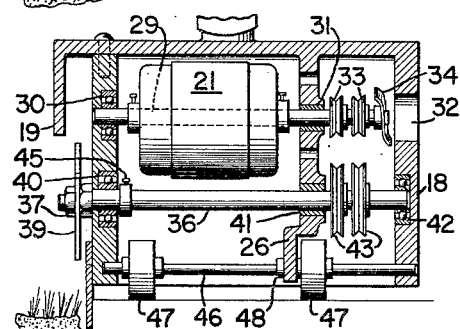
FIGURE 4 is a longitudinal median cross sectional view of the lawn trimmer.
Figure 3:
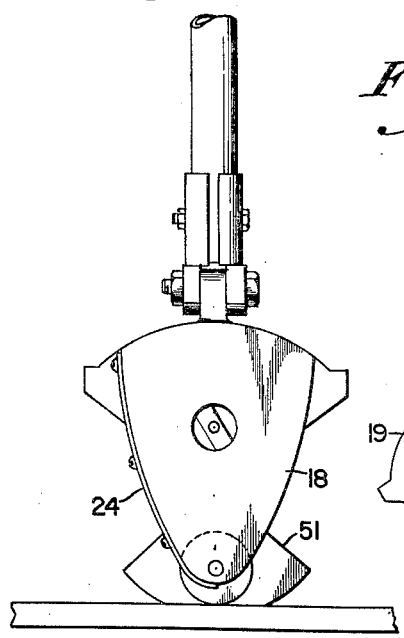
FIGURE 3 is an elevational view of the other side of the lawn trimmer.
Figure 7:
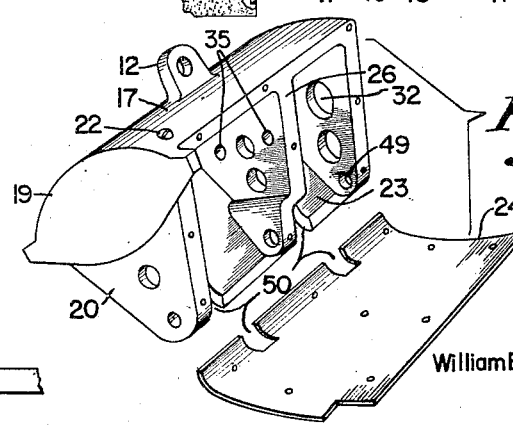
FIGURE 7 is a perspective of the cast housing and removed cover plate of the lawn trimmer of the present invention.

Attention is directed to FIGS. 4 and 7 for a view of a partition 26 in the housing which also has essentially a similar structural configuration as wall 18 and end plate 20. This partition is shown by dotted lines in FIG. 2. Retaining attention to FIG. 4, it is pointed out that a suitable electric motor 27 is mounted in the housing between the end plate 20 and the partition 26. It is affixed to rear wall 23 by suitable bracket means 28 as can be seen from FIG. 1. The motor is a high speed motor capable of operating at about 18,000 r.p.m. It has an armature shaft 29 which extends beyond the motor casing so that one end rotates in a bearing race 30 situated in end plate 20. The other end projects through a hole in partition 26 which carries another bearing race 31 for the motor shaft. The shaft terminates just prior to the end wall 18, which has a relatively large hole 32 for cooling air intake purposes. Two pulleys 33 are keyed on the shaft on the portion thereof projecting beyond the partition. A fan blade arrangement 34 terminates the shaft so that when the motor is operating, cooling air will be drawn through hole 32 and distributed through holes 35 in the partition to the electric motor. Directly beneath the just discussed arrangement is a horizontal parallel shaft 36 in the housing which projects for a distance beyond end plate 20. This portion of the shaft is threaded to receive nuts 37 and 38 between which a relatively small cutter blade 39 is rigidly secured. A bearing race 40 is built into the end plate 20. The shaft 36 passes through a suitable hole in the partition 26 in which a suitable bushing 41 is situated. The shaft ends in a bearing race 42 built into wall 18. Two pulleys 43 are keyed on the shaft in a manner so that suitable belts may operatively connect pulleys 33 with pulleys 43. It will be appreciated that the pulleys are grooved to accept the belts which are flexible and constructed of friction producing material. The pulleys keyed on the motor shaft have a smaller diameter than the pulleys on shaft 36. The belts 44 are shown by means of dotted lines in FIG. 2. The shaft 36 is prevented from leftward shifting movement by collar 45.

Below shaft 36 is another horizontal shaft 46 which acts as an axle for two roller wheels 47. Each of the wheels has its own bearing race so that shaft 46 need not be rotatably mounted. A stop collar 48 in juxtaposition on one side of the partition 26 prevents shaft 46 from sliding out of the housing through hole 49 in wall 18.

Due to the fact that the roller wheels 47 must project beyond the apex portion of the triangularly shaped housing, suitable channels 50 are cut into the rear wall 23 and front plate 24 of the housing as can be seen from FIG. 7.

It will be observed that the guard portion of the housing projects longitudinally to the line of travel or pathway at both ends of the housing to give wing-like portions 55. In this way a greater degree of protection from the revolving blade can be afforded.

In order to insure a straight cut which is even with, for instance, a paved pathway, a guide plate 51 is mounted to the outer side of the end plate 20 by means of screws 52 so that it projects below wheels 47. From FIGS. 1 and 2 the usefulness of the guide plate may be observed as it is permitted to ride along the edge of the paved path 53. It is pointed out that the guide plate has an arcuate depending or leading edge.

The cutter blade 39 is in a vertical plane with sharpened edges 54 on two diagonally oppositely disposed end portions. In the manner shown by FIG. 1, it will be necessary for the blade to turn clockwise for the cutting action to be effective. It will also be seen that the device is particularly useful in cutting grass which is lying in a more or less horizontal manner and projects from the soil zone onto the pathway.

Figure 5:
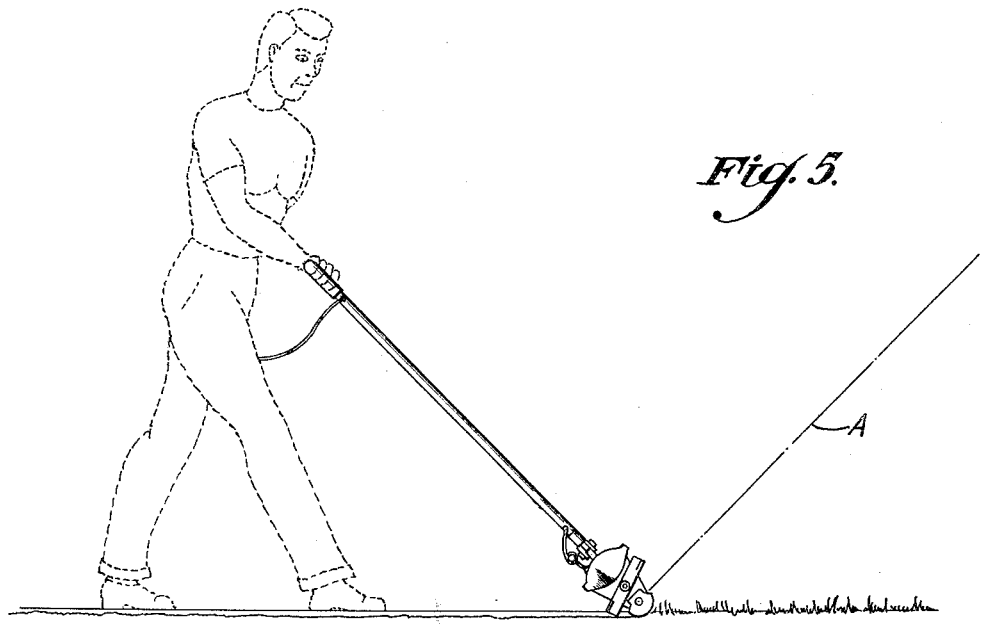
FIGURE 5 is a side view of the lawn trimmer in use.

The unique manner in which the handle is mounted on the housing permits extreme ease of operation and manipulation of the device of the present invention. In connection therewith, attention is directed to FIGS. 5 and 6 which illustrate the use of the device in two positions. From FIG. 5 it may be seen that the lawn trimmer is so positioned so that the guard arrangement protects the operator from any thrown material from the cutter blade when properly driven. Should the operator be operating from the other side, the handle would be along plane "A" so that the entire unit would have been turned through an angle. The operator would continue to be shielded from the revolving blade. The positioning of the guard arrangement affords an angular safety zone with the guard as the apex of the zone. Furthermore, the turning of the device through the desired angle is not hindered by the guide plate 51 due to the fact that it has an arcuate leading edge. As a matter of fact, the arcuate guide plate assists in changing the position of the device by being able to pivot thereon.

Figure 6:
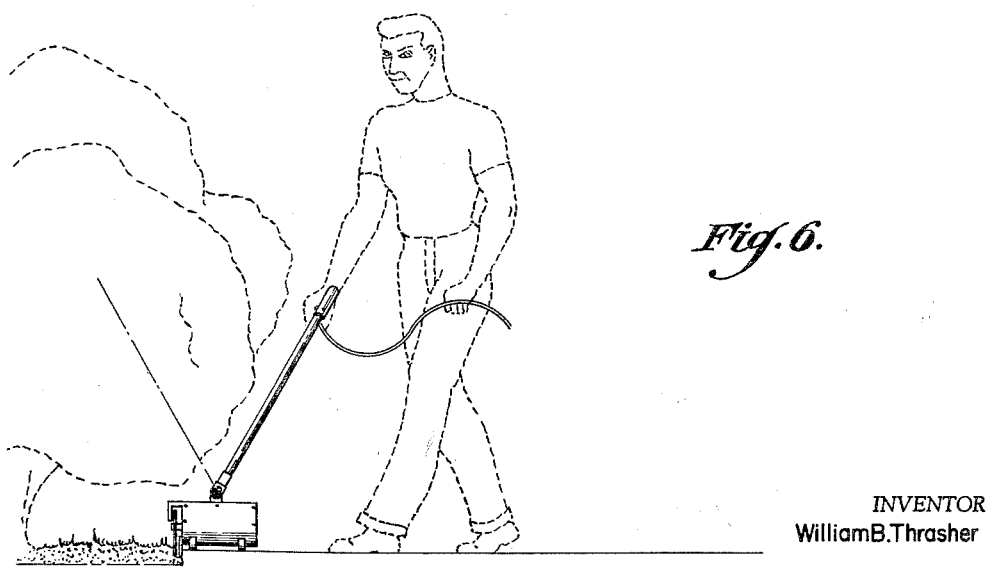
FIGURE 6 is a front view of the lawn trimmer in one mode of operation.

From FIG. 6 it can be seen that the operator need not follow the lawn trimmer in a path directly behind since this may prove to be impossible under certain conditions, such as when shrubs or the like are in the cutting line. By virtue of the feature that permits pivoting of the handle to either side of the device, the operator may side step the shrubbery as shown in FIG. 6.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. In a lawn trimmer the combination of a portable supporting housing, a handle perpendicularly mounted on the uppermost center portion of the housing, a motor mounted within the housing and having a horizontal drive shaft, a driven shaft in the housing having a portion projecting beyond one side thereof, a cutter blade mounted upon the driven shaft on the projecting portion, a vertical mounting support carried by the housing rotatably supporting thereon the drive shaft and driven shaft in horizontal closely paralleled relation with respect to each other, at least one pulley keyed on each of the drive and driven shafts, each having a tapered belt receiving groove therein, a short flexible belt of friction providing material trained over and around the grooves of said pulleys for the driving of said driven shaft, the housing being substantially symmetrical along a vertical plane through the cutter axis, the lower portion of the symmetrical portion of the housing having a parobolic configuration, at least two supporting wheels mounted within said housing, a portion thereof extending through openings in the apex portion of the parobolic portion housing, and said handle, said motor shaft, said driven shaft and the axis of said wheels being in descending order all within the same plane.

2. In a lawn trimmer the combination of a portable supporting housing, a handle perpendicuarly mounted on the uppermost center portion of the housing, a motor mounted within the housing and having a horizontal drive shaft, a driven shaft in the housing having a portion projecting beyond one side thereof, a vertical cutter blade mounted upon the driven shaft on the projecting portion, a vertical mounting support carried by the housing rotatably supporting thereon the drive shaft and driven shaft in horizontal closely paralleled relation with respect to each other, at least one pulley keyed on each of the drive and driven shafts, each having a tapered belt receiving groove therein, a short flexible belt of friction providing material trained over and around the grooves of said pulleys for the driving of said driven shaft, the housing being substantially symmetrical along a vertical plane through the cutter axis, the lower portion of the symmetrical portion of the housing having a parobolic configuration, at least two supporting wheels mounted within said housing, a portion thereof extending through openings in the apex portion of the parobolic portion housing, a guard means integral with one end of the top of the housing on the side where the cutter blade is mounted, said guard means including a depending flange terminating in an arcuate leading edge encompassing a portion of said cutter blade, and said handle, said motor shaft, said driven shaft and the axis of said wheels being in descending order all within the same plane.

3. In a lawn trimmer the combination of a portable supporting housing, a handle perpendicularly mounted on the uppermost center portion of the housing, a motor mounted within the housing and having a horizontal drive shaft, a driven shaft in the housing having a portion projecting beyond one side thereof, a vertical cutter blade mounted upon the driven shaft on the projecting portion, a vertical mounting support carried by the housing rotatably supporting thereon the drive shaft and driven shaft in horizontal closely paralleled relation with respect to each other, at least one pulley keyed on each of the drive and driven shafts, each having a tapered belt receiving groove therein, a short flexible belt of friction providing material trained over and around the grooves of said pulleys for the driving of said driven shaft, the housing being substantially symmetrical along a vertical plane through the cutter axis, the lower portion of the symmetrical portion of the housing having a parobolic configuration, at least two supporting wheels mounted within said housing, a portion thereof extending through openings in the apex portion of the parobolic portion housing, a guard means integral with one end of the top of the housing on the side where the cutter blade is mounted, said guard means including a depending flange encompassing a portion of said cutter blade, a vertical guide plate mounted on the same side of the housing as the cutter blade, said guide plate extending beyond the apex portion of the triangular housing and terminating in an arcuate leading edge, and said handle, said motor shaft, said driven shaft and the axis of said wheels being in descending order all within the same plane.

References Cited in the file of this patent

UNITED STATES PATENTS

| | | |
|---|---|---|
| Re. 21,274 | Orr | Nov. 21, 1939 |
| 2,486,640 | Garwood | Nov. 1, 1949 |
| 2,630,665 | Lauer | Mar. 10, 1953 |
| 2,653,381 | Rooke | Sept. 29, 1953 |
| 2,767,540 | Corbin | Oct. 23, 1956 |
| 2,805,535 | Schaefer | Sept. 10, 1957 |
| 2,827,748 | Simpson | Mar. 25, 1958 |
| 2,901,878 | Johnson | Sept. 1, 1959 |

FOREIGN PATENTS

| | | |
|---|---|---|
| 448,228 | Canada | May 4, 1948 |